Oct. 6, 1970  S. M. ELLIS ET AL  3,532,413
HEAD-UP DISPLAY APPARATUS FOR AIRCRAFT
Filed Jan. 13, 1969
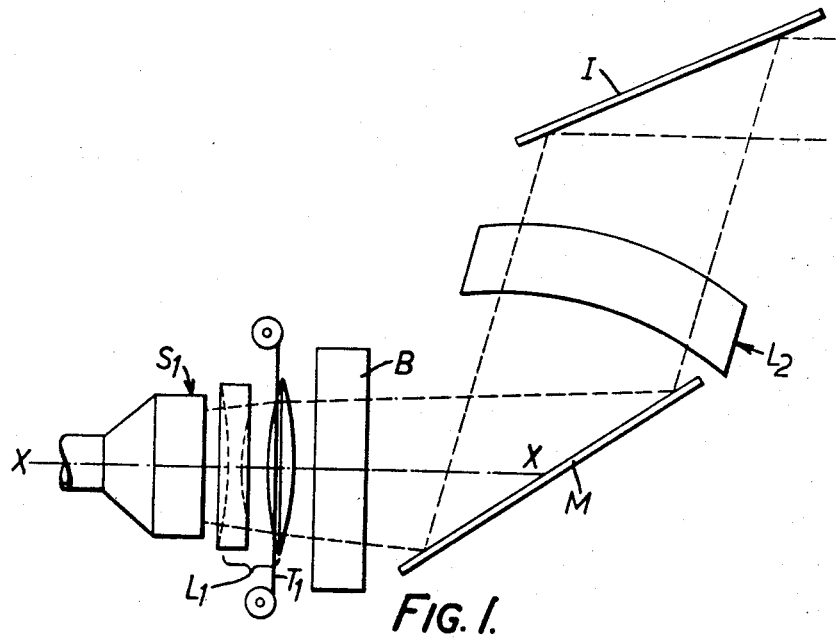
FIG. 1.
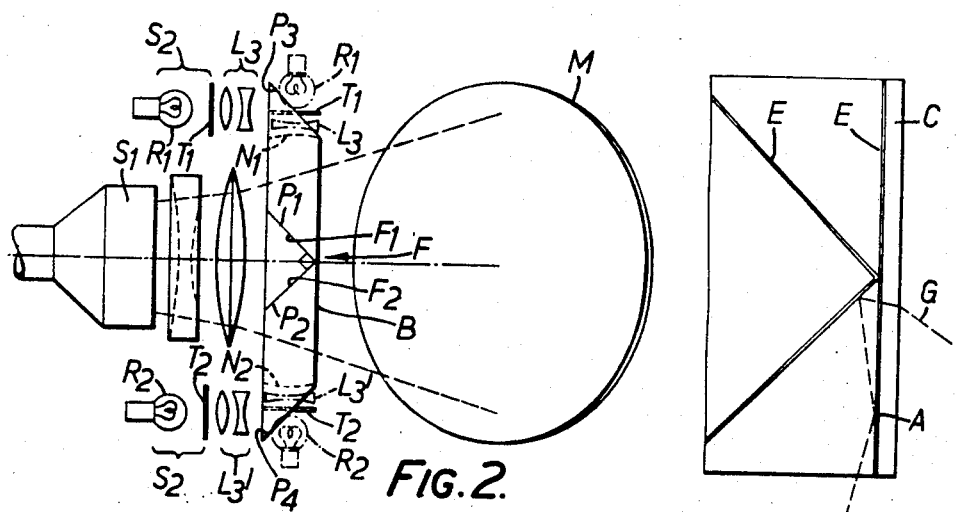
FIG. 2.
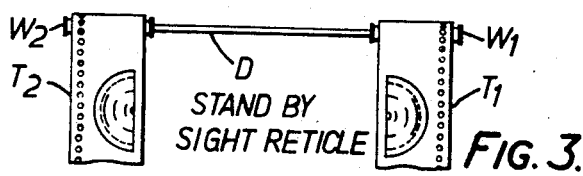
STAND BY SIGHT RETICLE   FIG. 3.
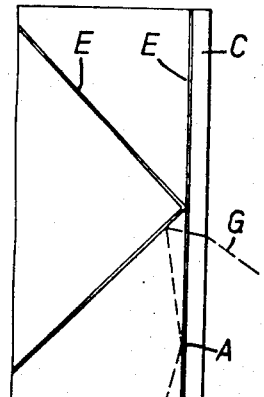
FIG. 4.
INVENTOR
STAFFORD M. ELLIS
DONALD R.C. PRICE
BY
ATTORNEYS

United States Patent Office 3,532,413
Patented Oct. 6, 1970

3,532,413
HEAD-UP DISPLAY APPARATUS FOR AIRCRAFT
Stafford M. Ellis and Donald R. C. Price, Lewisham, London, England, assignors to Elliott Brothers (London) Limited, London, England, a British company
Filed Jan. 13, 1969, Ser. No. 790,752
Claims priority, application Great Britain, Jan. 26, 1968, 4,096/68
Int. Cl. G02b 27/14
U.S. Cl. 350—174   3 Claims

ABSTRACT OF THE DISCLOSURE

An optical display apparatus for use in an aircraft includes a cathode ray tube operating with one colour display on the screen thereof and another source of visual information operating with another colour. These two information sources are displayed to an observer after collimation to superimpose the information on a distant scene. The second source is divided into two halves and visual signals from both sources are passed through a dichroic filter before display to the observer.

---

This invention relates to optical display apparatus and is particularly, but not exclusively, concerned with head-up or head-down display apparatus for use, for example, in an aircraft.

In the applicants' co-pending U.S. patent application Serial No. 742,412 (Geoffrey P. Richards et al.) various forms of display apparatus are described, a common feature of which is a dichroic filter. The latter filter comprises a relatively thin plate of optically-flat glass disposed in the path of light from two information sources and a dichroic film evaporated or otherwise deposited on one optically-flat surface of the plate so as to transmit light from one source and reflect light from the other source.

The use of a thin optically-flat glass plate as described has the disadvantage of introducing aberrations, in particular, a degree of astigmatism, into the optical system of the display and this disadvantage may more than offset a principal advantage of using a thin glass plate, namely, that the optical path length of the system is not appreciably increased by the introduction of the plate into the system.

To avoid aberrations, the dichroic film may be formed on a glass prism; but the introduction of such a prism would significantly increase the optical path length and have the added disadvantage, of importance in aircraft applications, of excessive weight.

According to the present invention there is provided optical display apparatus for use in an aircraft comprising a first information source operable to provide, within a first wave band, first optical information to be displayed, a second information source operable in two halves from two positions spanning the optical axis of the first source to provide within a second wave band, second optical information which can, at will, be displayed concurrently with the first optical information, optical filter means in the path of optical information from the first source which has a high transmissivity to optical information in the first wave band and a high reflectivity to optical information in the second wave band and which includes first and second dichroic film portions in the paths of optical information from the two halves of the second source, a first optical sub-system operative to collimate optical information from the first source, a second optical sub-system operative to collimate optical information from the second source and imaging means on which collimated optical information from both sources can be displayed with one superimposed on the other.

Embodiments of apparatus in accordance with the invention are hereinafter described, by way of example, with reference to the accompanying diagrammatic drawing, in which:

FIG. 1 shows an elevation of an aircraft head-up display apparatus;
FIG. 2 shows a plan view of the apparatus of FIG. 1;
FIG. 3 shows a detail of the apparatus shown in FIGS. 1 and 2; and
FIG. 4 shows an outline of a modification of FIG. 1.

The head-up display apparatus comprises: A first information source $S_1$ operable to provide, within a first, the "green," waveband first optical information to be displayed, a second information source $S_2$ operable to provide within a second, the "red," waveband optical information which it might be desired to display concurrently with information from the first source $S_1$; and optical filter means which has a high transmissivity to optical information in the "green" waveband and a high reflectivity to optical information in the "red" waveband, and comprises first and second dichroic film portions, $F_1$ and $F_2$, respectively. Both film portions $F_1$, $F_2$ lie in the path of optical information from the first source $S_1$. Further, the film portions $F_1$ and $F_2$ are in the path of optical information from the second information source $S_2$.

There is a first optical sub-system comprising lens arrangements $L_1$ and $L_2$ operative to collimate information from the source $S_1$. A second optical sub-system comprising lens arrangements $L_3$, $L_2$ and $L_3'$, $L_2$, collimates information from the source $S_2$. Collimated information from the sources $S_1$ and $S_2$ is displayed, superimposed, on imaging means I. Where, as with the head-up display apparatus illustrated, the information from the sources $S_1$ and $S_2$ is to be viewed against an image of a distant scene, the imaging means I comprises a ray combining semi-reflector on the line of sight of the observer to the distant scene and the apparatus may then include a mirror or analogus image-erecting device M.

The optical filter means F comprises a body B of glass which has two surface portions $P_1$ and $P_2$ which are inclined to the optical axis X of the system and are at right angles to each other. The dichroic film portions $F_1$ and $F_2$ are formed on the surfaces $P_1$ and $P_2$, respectively. As shown, the source $S_2$ comprises light sources $R_1$ and $R_2$, and transparencies $T_1$ and $T_2$ (FIG. 3). Alternatively, the transparencies can be illuminated by means of fibre optics and in this case illumination can be restricted to the bright elements of the display pattern thus economising in light and reducing the heat input. Each transparency $T_1$, $T_2$ carries certain information, for example half of the information relating to a "standby" sight which it might be desired to display concurrently with information from the source $S_1$. Such information is reflected by surfaces $P_3$ and $P_4$ of the body B and is reflected in the direction of the optical axis X—X by the dichroic films $F_1$, $F_2$.

As shown, the source $S_1$ comprises a cathode ray tube screen.

Optical information from the cathode ray tube screen is reflected by the semi-reflector I to the observer. The optical information from the second ("standby" sight) $S_2$, is complementary information, that is complementary in the sense that information from the latter source $S_2$ is displayed on substantially contiguous portions of the semi-reflector I so that the "standby" sight information might be thought as emanating from a unitary information source.

It might be, and generally is, desirable to provide for relative movement between the display on the semi-reflector of information from the source $S_1$ and from the source $S_2$. As shown in FIG. 3, the transparencies $T_1$ and $T_2$ are synchronously movable by sprockets $W_1$ and $W_2$ which are driven by a common shaft D and which engage sprocket holes in the transparencies. Alternative mechanical drives, particularly in conjunction with the alternative position of the transparencies $T_1$, $T_2$ as shown in broken lines and with the use of fibre optics are possible.

Whilst the optical filter means F is shown (FIGS. 1 and 2) as being disposed intermediate the lens sub-system $L_1$ and the erecting mirror M the relative positions of the filter means F and the lens sub-system $L_1$ could be reversed, that is the lens sub-system could be located at the illustrated position of the filter means F, and vice versa.

The reflecting surfaces $P_3$, $P_4$ can be omitted and the transparencies $T_1$, $T_2$ are then mounted in the alternative position shown in the broken lines. The advantage or disadvantage of doing this depends on the optical path length to the transparencies. If the alternative position is used the glass body B might (as indicated in broken lines) be provided with compensating surfaces $N_1$ and $N_2$ instead of the reflecting surfaces $P_3$ and $P_4$. In this alternative, the source $S_2$ would be positioned as shown in broken lines and only one lens $L_3$, $L_3'$ need be used in association with each "half source" $S_2$.

As herein described, display apparatus according to the present invention utilises a body of glass which is thicker than the glass plate described in the co-pending application hereinbefore mentioned but appreciably thinner than the prism hereinbefore referred to and optical filter means which comprises two dichroic film portions deposited on prism surfaces intersecting each other at 90° on the optical axis of the system, each surface being inclined at 45° to the optical axis so as to define a substantially V-shaped groove which is symmetrical with respect to the optical axis of the system.

By so inclining the said prism surfaces a ray combining semi-reflector is formed which operates in two opposite directions at the same time, has a relatively modest dimension in the direction of the optical axis of the system and is without the aberrations which would be introduced by the use of a thin glass plate.

One undesirable feature of the use of two dichroic surfaces, $P_1$, $P_2$ is the visibility of a dividing line at the centre of the image. By high accuracy of machining of the glass optical components, this dividing line can be made very thin, but will not vanish entirely. Its visibility can be further reduced by filling the joint between the dichroic surfaces with optical cement.

With reference to FIG. 4, the dividing line can be made to vanish by cementing a cover glass C over the prism with optical cement E. When making this modification it must be taken into account that certain sight lines G must be reflected on the front face at position A on the prism. This, preferably total, reflection is necessary in order to obtain a graticule image without gaps in all eye positions of the observer. Total reflection can be ensured by making the refractive index of the cover glass lower than that of the prism by a sufficient amount or alternatively by adding another dichroic coating (not shown) between the prism and cover glass C.

We claim:

1. Optical display apparatus for use in an aircraft comprising
   a first information source operable to provide, within a first wave band, first optical information to be displayed,
   a second information source operable in two halves from two positions spanning the optical axis of the first source to provide within a second wave band, second optical information which can, at will, be displayed concurrently with the first optical information,
   optical filter means in the path of optical information from the first source which filter means has a high transmissivity to optical information in the first wave band and a high reflectivity to optical information in the second wave band and which includes
   a first dichroic film portion and
   a second dichroic film portion disposed at right angles to the first dichroic film portion,
   both said film portions lying in the paths of optical information from the two halves of the second source and symmetrically about the optical axis of the first information source,
   a first optical sub-system operative to collimate optical information from the first source,
   a second optical sub-system operative to collimate optical information from the second source, and
   ray-combining means on which collimated optical information from both sources can be displayed with one superimposed on the other, said ray-combining means including
   a semi-reflector disposed on the line of sight of the observer to a distant scene and on the line of sight from the information sources to the observer.

2. Apparatus according to claim 1, wherein said second information source comprises two transparencies and light sources, and said apparatus further comprises means for moving said transparencies synchronously relatively to the respective dichroic film portions.

3. Apparatus according to claim 1 comprising a plane cover glass secured by optical cement to the elements defining the two dichroic film portions.

References Cited

UNITED STATES PATENTS 2,677,722  5/1954  Bedford _____ 350—174 X

DAVID SCHONBERG, Primary Examiner

J. W. LEONARD, Assistant Examiner

U.S. Cl. X.R.

178—5.4; 350—138